United States Patent [19]

Watase

[11] 4,071,048
[45] Jan. 31, 1978

[54] COATED HOLLOW METAL TUBES AND PROCESS FOR PRODUCING COATED HOLLOW METAL TUBES PROCESSED BY BENDING, PRESSING OR PUNCHING

[75] Inventor: Hideo Watase, Hino, Japan

[73] Assignee: Teijin Chemicals, Ltd., Tokyo, Japan

[21] Appl. No.: 687,449

[22] Filed: May 18, 1976

[30] Foreign Application Priority Data

Aug. 18, 1975  Japan .................................. 50-99516

[51] Int. Cl.² ............................................... F16L 9/14
[52] U.S. Cl. ..................... 138/145; 138/139; 138/140; 138/143; 138/177; 428/458
[58] Field of Search ............... 138/137, 139, 140, 141, 138/143, 145, 177, DIG. 7, DIG. 3; 72/46; 428/36, 458

[56] References Cited

U.S. PATENT DOCUMENTS

| 2,861,022 | 11/1958 | Lundsager | 428/458 |
| 2,892,747 | 6/1959 | Dye | 428/458 |
| 2,961,365 | 11/1960 | Sroog | 428/458 X |

FOREIGN PATENT DOCUMENTS

| 857,933 | 1/1961 | United Kingdom | 138/145 |
| 852,619 | 10/1960 | United Kingdom | 138/145 |

*Primary Examiner*—Richard E. Aegerter
*Assistant Examiner*—James E. Bryant, III
*Attorney, Agent, or Firm*—Sherman & Shalloway

[57] ABSTRACT

A coated hollow metal tube being processable by bending, pressing or punching without the cracking or peeling of the coating; said tube comprising a hollow metal tube and a coating, in tight adhesion thereto, of a thermoplastic crystalline copolyester having a second order transition point of at least 50° C and a degree of crystallization of not more than 15%. A coated hollow metal tube processed by bending, pressing or punching is produced by coating the hollow metal tube with the thermoplastic crystalline copolyester, cooling the coating, and then subjecting the coated hollow metal tube to bending, pressing or punching. The product has utility in furniture, conduits for municipal gas and water supplying facilities, automobile parts, and other indoor or outdoor articles and building materials.

17 Claims, No Drawings

COATED HOLLOW METAL TUBES AND PROCESS FOR PRODUCING COATED HOLLOW METAL TUBES PROCESSED BY BENDING, PRESSING OR PUNCHING

This invention relates to a coated hollow metal tube, and a process for producing a coated hollow metal tube processed by bending, pressing or punching. More specifically, the invention relates to a hollow metal tube coated in tight adhesion with a thermoplastic crystalline copolyester having a second order transition point of at least 50° C. and a degree of crystallization of not more than 15%, and to a process for producing said coated hollow metal tube processed by bending, pressing or punching.

It has been well known heretofore to coat metals with polymers. When this technique is used for laminates or wire jacketing, there is hardly any problem of processing for their end uses. Metal tubes require fabrication such as bending, pressing or punching for many end uses. Since the bending or pressing of metal tubes results in extremely severe action on the coatings unlike the case of bending a wire, the heretofore known coated metal tubes have poor workability. For example, when a metal tube coated with polyethylene or vinyl chloride polymer by melt-extrusion is subjected to bending, pressing or punching, the coatings may be detached from the metal surface, creased, or broken. This limits the application of the metal coated tubes to a very narrow range.

When polymers having a higher second order transition point are used for coating, the product has higher heat stability, but its workability decreases. In order to coat a metal base with a polyester, British Pat. Nos. 852,619 and 857,933 disclose a method of coating or laminating an amorphous copolyester on a metal base, and U.S. Pat. No. 3,829,545 discloses a method of coating a wire by melt-extruding polyethylene terephthalate. But these patents do not at all disclose the coating of metal tubes.

Our investigations show that when the amorphous copolyester disclosed as a preferred species in the above British Patents is used for coating hollow metal tubes, the coatings are broken at the time of bending or pressing, and that when polyethylene terephthalate is used for coating hollow metal tubes as in the above-cited United States Patent, its adhesion to the hollow metal tubes is poor. In addition, the coating is broken, or is stripped off from the metal tubes at the time of bending, pressing or punching.

Accordingly, it is an object of this invention to provide a hollow metal tube coated with a copolyester in which the coating has been obtained by an easy coating operation and has good adhesion and is neither peeled off nor broken when fabricated by bending, pressing or punching; and a process for producing such a coated hollow metal tube.

Another object of this invention is to provide a coated hollow metal tube having a high chemical resistance, corrosion resistance, weatherability and thermal stability, toughness, soil resistance, and a smooth lustrous beautiful appearance, and a process for producing this coated hollow metal tube.

Other objects and advantages of this invention will become apparent from the following description.

The objects of the present invention can be achieved by a hollow metal tube coated with a thin film of a thermoplastic crystalline copolyester, said tube comprising a hollow metal tube and a coating of a thermoplastic crystalline copolyester adhered tightly to the outer surface of the hollow metal tube, said copolyester being a thermoplastic crystalline copolyester composed of 95 to 70 mole%, based on its entire recurring units, of ethylene terephthalate units and 5 to 30 mole%, based on its entire recurring units, of a copolycondensable ester-forming unit other than the ethylene terephthalate unit or a thermoplastic polyester blend capable of affording the same composition as the copolyester on the whole, and having a second order transition point of at least 50° C., and said thin coating of copolyester being kept at a low degree of crystallization of not more than 15%.

The coated hollow metal tube of this invention can be worked by bending, pressing or punching without causing cracking or peeling of the coating.

The metal tubes that can be used in the present invention are, for example, hollow tubes made of iron, aluminum, copper, or alloys containing these metals.

The thermoplastic crystalline copolyester used in the present invention is either A. a copolyester composed of 95 to 70 mole%, preferably 95 to 75 mole%, especially 95 to 80 mole%, based on its entire recurring units, of an ethylene terephthalate unit and 5 to 30 mole%, preferably 5 to 25 mole%, especially 5 to 20 mole%, based on its entire recurring units, of a copolymerizable ester-forming unit other than the ethylene terephthalate unit, or B. a thermoplastic polyester blend in which the structural units as a whole are of the same composition as the copolyester (A).

In the present invention, the copolyester (A) and the polyester blend (B) are inclusively called a copolyester.

The ester-forming units copolycondensable with the ethylene terephthalate unit are those composed of an acid component, for example, a dibasic carboxylic acid, such as an aliphatic dicarboxylic acid containing 4 to 20 carbon atoms (e.g., succinic acid, adipic acid and sebacic acid), and an aromatic dicarboxylic acid (e.g., terephthalic acid, isophthalic acid, diphenyl-4,4'-dicarboxylic acid, naphthalene-2,6-dicarboxylic acid, diphenylether-4,4'-dicarboxylic acid, diphenylsulfone-4,4'-dicarboxylic acid, diphenylmethane-4,4'-dicarboxylic acid and diphenoxyethane-4,4'-dicarboxylic acid; and a dihydric alcohol component, for example, a diol such as ethylene glycol, propylene glycol, cyclohexane-1,3-diol, cyclohexane-1,4-dimethanol, neopentyl glycol, or 2,2-bis[4-($\beta$-hydroxyethoxy)phenyl]propane. Any ester-forming units other than the ethylene terephthalate unit can be used in this invention. Also, the copolycondensable unit may be an ether-ester unit such as $\beta$-hydroxyethoxy benzoate.

Examples of the blend (B) are blends of i. polyethylene terephthalate, and ii. at least one other polyester derived from the above-described acid component and diol component, for example, polyethylene isophthalate, polyethylene adipate, polypropylene terephthalate or polyneopentyl terephthalate, or at least one polyether ester such as poly(p-ethoxybenzoate), which are prepared such that these structural units are of the same composition as the structural units of the copolyester (A).

The copolyesters used in the present invention have an intrinsic viscosity [$\eta_{inh}$], measured at 35° C. for a solution of the polymer in o-chlorophenol, of at least 0.5, preferably at least 0.58, especially 0.58 to 0.9.

Polyethylene neopentyl terephthalate composed of 95 to 75 mole%, preferably 95 to 80 mole%, of an ethylene terephthalate unit and 5 to 25 mole%, preferably 5 to 20 mole%, of a neopentyl terephthalate unit can be used especially preferably as the copolyester. This polyethylene neopentyl terephthalate has especially superior toughness against bending, pressing or punching, and is a material most suited for these processing operations.

The crystalline copolyester has a degree of crystallization, which is attained when the copolyester in a substantially amorphous state is maintained at 150° C. for 3 hours (to be referred to as a crystallizing ability), of at least 10%, preferably at least 15%. Preferably, it is coated on a hollow metal tube in a thin film of 50 to 300 microns (0.05 to 0.3 millimeter) in thickness, and after coating tightly to the hollow tube and cooling, the coating retains a low degree of crystallization not exceeding 1/2.5, preferably 1/3, of its crystallizing ability.

The relation of the copolymerization ratios of polyethylene tere-isophthalate and polyethylene neopentyl terephthalate, to the degree of crystallization (crystallizing ability) which the copolyester attains when in a substantially amorphous state maintained at 150° C. for 3 hours is shown in Table 1.

Table 1

| (crystallizing ability in %) | | | | | | |
|---|---|---|---|---|---|---|
| Copolymerization unit | Copolymerization ratio (mole%) | 0 | 5 | 15 | 25 | 35 |
| Ethylene isophthalate | Crystallizing ability (%) | 43 | 40 | 31 | 18 | 0 |
| | Second order transition point (° C.) | 71 | 67 | 64 | 63 | 63 |
| Neopentyl terephthalate | Crystallizing ability (%) | 43 | 37 | 25 | 13 | 0 |
| | Second order transition point (° C.) | 71 | 68 | 65 | 64 | 63 |

The crystallizing ability and the second order transition point in the present application were measured by the following methods.

Method for measuring the degree of crystallization

The degree of crystallization (%) of a sample is calculated in accordance with the following equation.

$$\frac{100}{\rho} = \frac{x}{\rho c} + \frac{100 - x}{\rho a}$$

wherein $\rho$ is the density of the sample measured at 20° C. in n-heptane/carbon tetrachloride using a density gradient tube; $\rho_c$ is the density of a crystal which is 1.445, and $\rho_a$ is the density of an amorphous polymer measured after pouring the polymer in the molten state into ice water to quench it.

Where the polymer contains an inorganic substance such as a pigment, its degree of crystallization cannot be determined by density measurement. Hence, the relation between the degree of crystallization determined by another method, for example, an X-ray method and the degree of crystallization determined by the density method is established, and the degree of crystallization according to the density method is calculated from the measured values obtained by the other method.

Method of measuring the second order transition point

The measurement is performed using a differential thermal analyzer (a standard type of a differential thermal analyzer, made by Rigaku Denki Kabushiki Kaisha). The measuring conditions were as follows: the temperature raising speed 10° C./min.; DTA range ± 50 μV; the amount of the sample 10 mg. Alumina was used as a control sample.

Thus according to the present invention, a coated hollow metal tube which has been bended, pressed or punched can be manufactured by coating the outer surface of a hollow metal tube in tight adhesion with a thermoplastic crystalline copolyester composed of 95 to 70 mole%, based on its entire recurring units, of an ethylene terephthalate unit and 5 to 30 mole%, based on its entire recurring units, of a copolycondensable ester-forming structural unit other than the ethylene terephthalate unit, or a blend of thermoplastic polyesters capable of giving the same composition as said copolyester on the whole, said copolyester or polyester blend having a second order transition point of at least 50° C. and being in the molten state; cooling the coating; and then subjecting the coated hollow metal tube to bending, pressing or punching.

In a preferred embodiment of the present invention, the above thermoplastic crystalline copolyester has a degree of crystallization (the crystallizing ability), attained when maintained at 150° C for 3 hours in its substantially amorphous state, of at least 10%, preferably at least 15%, and the molten polyester is coated on the hollow metal tube so that after cooling it becomes a coating having a thickness of 50 to 300 microns which retains its low degree of crystallization not exceeeding 1/2.5, preferably ⅓, of its crystallizing ability.

By coating a thermoplastic crystalline copolyester having a crystallizing ability of at least 10%, preferably at least 15%, on the outer surface of a hollow metal tube to form a thin coating having a degree of crystallization not exceeding 1/2.5, preferably ⅓, of its crystallizing ability, the resulting coated metal tube can be worked by bending, pressing or punching without damages such as peeling or cracking against severe deformations such as compression, impact or pulling normally experienced in such working processes.

When the copolyester has a crystallizing ability of less than 10%, its stretchability, for example, is reduced, and the coated metal tube cannot withstand such severe deformations. Furthermore, when the degree of crystallization of the coating formed on the hollow metal tube approaches the crystallizing ability, its resistance to the above severe deformations is reduced, or its adhesion to the tube is reduced. This results in a higher rate of damage at the time of working. Advantageously, therefore, the degree of crystallization of the coating does not exceed 1/2.5, preferably ⅓, of its crystallizing ability.

When the thickness of the coating on the metal tube is too thin, it tends to be broken by, for example, scratching during processing or in end uses. On the other hand, if the thickness of the coating is too large, it is difficult to adjust its degree of crystallization to the suitable range mentioned above, and its resistance to the severe deformations during processing is reduced. Accordingly, it is preferred to coat the copolyester coating to a thickness of 50 to 300 microns.

In order to adjust the degree of crystallization of the resulting coating to a predetermined value not exceeding 1/2.5 of its crystallizing ability, it is advantageous to cool the applied coating as rapidly as possible, for example, by such means as cooling with water. By this procedure, the degree of crystallization of the coating can be adjusted to not more than 15%, preferably not more than 10%, and not more than 12.5, preferably not more than ⅛, of its crystallizing ability. The degree of crystallization of the resulting coating may be lower to any extent than the above-specified upper limit, but usually, it is 1 to 3%, or more.

The copolyester used for coating may contain minor amounts of additives such as pigments, dyes, metallic powders, delusterants, fire retardants, antioxidants, ultraviolet stabilizers, filler, reinforcing agents or other polymers.

The coating of metal tubes is performed by a melting method. For example, there can be advantageously used a method which comprises melt-extruding the copolyester through an extruder equipped with a cross head die onto the heated outer surface of a metal tube, and cooling the coating as rapidly as possible, and a method which comprises fitting a heat-shrinkable tube of the copolyester over a metal tube, heating it to melt-adhere it to the outside surface of the metal tube, and cooling it as rapidly as possible.

The coated hollow metal tube of this invention so obtained can be easily bended, pressed or punched by means of known working machines. Or it can be deformed into the desired shape by, for example, a swaging machine. The working of the coated metal tube can be performed at room temperature, but preferably while heating the coating to a temperature of 30° to 100° C., especially 40° to 70° C. When the resulting coated metal tube thus processed is heated, the coating is crystallized and becomes a hard coating having good heat stability and chemical resistance. However, since its crystallization proceeds when the coated metal tube is used at high temperatures, it is not always necessary to heat it in advance.

For this reason, it is advantageous to adjust the degree of crystallization of the copolyester coating of the hollow metal tube to not more than 15%, especially not more than 1/2.5 of its crystallizing ability, before working by bending, pressing or punching. On the other hand, in order to obtain coatings having high hardness and superior heat stability and chemical resistance, it is advantageous to use copolyesters having a great crystallizing ability. Such copolyesters can be obtained by using lesser amounts of the copolymer component within the specified range, in particular, using 5 to 25 mole%, especially 5 to 20 mole%, of the copolymer component.

The coated hollow metal tubes of this invention worked in the manner mentioned above by, for example, bending, pressing or punching can be fabricated into various forms, and used in various indoor or outdoor articles and building or constructing materials, for example, in furniture such as beds, chairs, sofas, tables or wardrobes, conduits for municipal gas and water supplying facilities, electrical appliances and component parts such as lamp stands or antennas, parts of vehicles such as bicycles, automobiles or baby carts, component parts of various kinds of machinery, toys, road markings, or decorative pipes.

The following Examples illustrate the present invention.

EXAMPLE 1

A polyethylene terephthalate copolymer having 10 mole% of a neopentyl terephthalate unit copolymerized with it ($[\eta_{inh}] = 0.802$; second order transition point 66° C.) was extruded in the molten state through an extruder equipped with an annular die, cooled, and wound up. Compressed air was injected into the resulting tubular article from its end, and the tubular article was passed through a heating zone (hot water) to expand and stretch it to 3.3 times in the diametrical direction. At the same time, it was stretched to 3.7 times in the longitudinal direction by means of differential speed rolls. The resulting heat-shrinkable tube with a diameter of 14 mm and a thickness of 75 microns was fitted over a steel tube having an outside diameter of 13 mm and a thickness of 1 mm, and the assembly was passed through a cylindrical electrical furnace with a length of 40 cm and an inside diameter of 5.5 cm whose inside atmosphere was maintained at 400° C. at a rate of 40 cm per minute. When it was cooled by pouring cold water, there was obtained a steel tube whose outer surface was coated with a firmly adhered layer of the above copolyester having a degree of crystallization of 7% (which corresponded to about ¼ of its crystallizing ability). The coated tube was collapsed flat by a press, or its was perforated by a press. Processed tubes free from damages or peeling of the coating were obtained.

When the processed tubes were heat-treated at 120° C for 30 minutes, the crystallization of the coatings advanced, and finally the hardness of the coatings increased to a pencil hardness of 3H from H.

EXAMPLE 2

A steel tube having an outside diameter of 13 mm and a thickness of 1 mm was heated to 260° C., and passed through a cross head die attached to an extruder. It was coated with a polyethylene terephthalate copolymer having 15 mole% of an ethylene isophthalate unit copolymerized therewith ($[\eta_{inh}] = 0.641$; second order transition point 64° C.) extruded in the molten state in a tubular form from the cross head die. The assembly was then cooled by pouring cold water thereon. The resulting coating had a thickness of 200 microns, and adhered firmly to the outside surface of the steel tube. It had a degree of crystallization of 10% (which corresponded to about 1/3.5 of its crystallizing ability). The coated steel tube was bent at right angles (R = 40 mm) by a bending machine, but the coating was neither damaged nor peeled.

EXAMPLE 3

A steel tube having an outside diameter of 15.9 mm and a thickness of 1.1 mm was heated to 260° C. and passed through a cross head die attached to an extruder. It was coated intimately with a polyethylene terephthalate copolymer having 10 mole% of a neopentyl terephthalate unit copolymerized with it ($[\eta_{inh}] = 0.802$; second order transition point 66° C.) which was melt-extruded in a tubular form through the cross head die. It was then cooled by pouring cold water thereon. By adjusting the amount of cold water, coated tubes with a coating having a degree of crystallization of 6%, 12%, and 18%, respectively, were obtained. The coatings of these coated tubes all had a thickness of 200 microns.

When these coated tubes were collapsed flat by a press, all of forty samples having a degree of crystallization of 6% (corresponding to about 1/5 of the crystallizing ability; which is within the preferred range specified in the present invention) could be processed satisfactorily. However, peeling occurred in 4 samples out of 40 samples having a degree of crystallization of 12% (corresponding to about 1/2.5 of the crystallizing ability). In contrast, out of 40 samples having a degree of crystallization of 18% (corresponding to about 1/1.7 of the crystallizing ability; which is outside the range of the present invention), peeling occurred in 39 samples.

EXAMPLE 4

A steel tube having an outside diameter of 15.9 mm and a thickness of 1.1 was heated to 280° C., and passed hrough a cross head die attached to an extruder. It was coated in tight adhesion with polyethylene neopentyl terephthalate containing a neopentyl terephthalate unit in the varying proportions indicated in Table 2 ($[\eta_{inh}]$ = 0.80 to 0.81) or, for comparison, with polyethylene terephthalate ($[\eta_{inh}]$ = 0.650) which was melt-extruded in a tubular form from the cross head die, and then cooled by pouring cold water thereon. The resulting coated tubes all had a coating thickness of 180 microns.

Each of these coated tubes were cut to a length of 50 cm. Forty test pieces of each of the coated tubes were bended at an angle of 180° (R = 40 mm) using a bending machine. The ratio of the test pieces in which the coating was damaged by cracking or peeling for example (ratio of poor products, %) was determined, and the results are shown in Table 2.

In Runs Nos. 2 to 4 which were within the scope of the present invention with a copolymer unit proportion of 5 to 30 mole% and a crystallizing ability of at least 10%, the ratio of poor products is low, and in Runs Nos. 1 and 5 which were outside the scope of the present invention, the ratio of poor products increased markedly. It can be seen from the results obtained that the proportion of the copolymer unit is preferably 5 to 25 mole%, especially preferably 5 to 20 mole%, and the crystallizing ability of the copolyester is preferably at least 15%. In Table 2, the degree of crystallization of the coating was not more than ⅓ of the crystallizing ability in all Runs.

Table 2

| Run No. | Copolymer (mole%) | Crystallizing ability (%) | Degree of crystallization of the coating (%) | Ratio of poor products (%) |
|---|---|---|---|---|
| 1 | 0 | 43 | 13 | 85 |
| 2 | 5 | 37 | 11 | 5 |
| 3 | 15 | 25 | 8 | 0 |
| 4 | 25 | 13 | 3 | 10 |
| 5 | 35 | 0 | 0 | 38 |

EXAMPLE 5

A biaxially oriented heat-shrinkable tube was produced in the same way as in Example 1 from a mixture of a blend consisting of 70 parts by weight of a polyethylene terephthalate having 10 mole% of a neopentyl terephthalate unit copolymerized therewith ( $\eta_{inh}$ = 0.802) and 30 parts by weight of polyethylene terephthalate ($\eta_{inh}$ = 0.650) and 0.5% by weight of a yellow dye. The resulting heat-shrinkable tube with an inside diameter of 18.9 mm and a thickness of 55 microns was fitted over an aluminum tube having an outside diameter of 18 mm and a thickness of 1 mm, and heat-treated at about 150° C. to cause it to adhere tightly to the outside surface of the aluminum tube. The assembly was then passed at a rate of 0.5 m/min. through three cylindrical electric furnaces each with a length of 40 cm and an inside diameter of 8 cm and with an inside atmosphere being maintained at 400° C. which were connected in series. Water was poured onto the tubular assembly immediately after it left the last electric furnace.

The coating had a degree of crystallization of 4% (corresponding to about ⅓ of the crystallizing ability).

The aluminum tube with a beautiful yellow coating thus obtained was bent at right angles, but the coating was neither cracked nor peeled.

What we claim is:

1. A hollow metal tube coated with a thin film of a thermoplastic crystalline copolyester and being processable by bending, pressing or punching without the cracking or peeling of the coating; said hollow metal tube having a thin coating adhered tightly to the outer surface thereof of a thermoplastic crystalline copolyester composed of 95 to 70 mole%, based on its entire recurring units, of ethylene terephthalate units and 5 to 30 mole%, based on its entire recurring units, of a copolymerizable ester-forming unit other than the ethylene terephthalate unit and having a second order transition point of at least 50° C., said coating having a degree of crystallization of more than 1% and not more than 15%, and not more than 1/2.5 of its crystallizing ability, said crystallizing ability being the degree of crystallization attained when the copolyester in a substantially amorphous state is maintained at 150° C. for 3 hours.

2. The coated hollow metal tube of claim 1 wherein said crystalline copolyester has a degree of crystallization of not more than 10% and not more than ⅓ of its crystallizing ability, said copolyester having a crystallizing ability of at least 10% and said coating having a thickness of 50 to 300 microns.

3. The coated hollow metal tube of claim 1 having a crystallizing ability of at least 15%.

4. The coated hollow metal tube of claim 1 wherein said crystalline copolyester is composed of 95 to 75 mole% of an ethylene terephthalate unit and 5 to 25 mole% of a neopentyl terephthalate unit.

5. The coated hollow metal tube of claim 1 wherein said crystalline copolyester is composed of 95 to 80 mole% of an ethylene terephthalate unit and 5 to 20 mole% of a neopentyl terephthalate unit.

6. A hollow metal tube coated with a thin film of a thermoplastic crystalline copolyester and being processable by bending, pressing or punching without the cracking or peeling of the coating; said hollow metal tube having a thin coating adhered tightly to the outer surface thereof of a thermoplastic crystalline copolyester composed of 95 to 75 mole%, based on its entire recurring units, of ethylene terephthalate units and 5 to 25 mole%, based on its entire recurring units, of a copolymerizable ester-forming unit other than the ethylene terephthalate unit and having a second order transition point of at least 50° C.; said coating having a degree of crystallization of more than 1% and not more than 15%, and not more than 1/2.5 of its crystallizing ability, said polyester having a crystallizing ability of at least 10%, said crystallizing ability being the degree of crystallization attained when the copolyester in a substantially amorphous state is maintained at 150° C. for 3 hours, and said coating having a thickness of 50 to 300 microns.

7. The coated hollow metal tube of claim 6 wherein said crystalline copolyester has a degree of crystallization of not more than 10% and not more than ⅓ of its crystallizing ability.

8. The coated hollow metal tube of claim 6 wherein said crystalline copolyester has a crystallizing ability of at least 15%.

9. The coated hollow metal tube of claim 6 wherein said ester-forming unit other than ethylene terephthalate is an ester-forming unit which is copolycondensable with the ethylene terephthalate unit and is a member selected from the group of reaction products of succinic acid, adipic acid and sebacic acid, isophthalic acid, diphenyl-4,4'-dicarboxylic acid, naphthalene-2, 6-dicarboxylic acid, diphenylether-4,4'-dicarboxylic acid, diphenyl-sulfone-4,4'-dicarboxylic acid, diphenylmethane-4,4'-dicarboxylic acid, diphenoxyethane-4,4'-dicarboxylic acid, and a dihydric alcohol selected from the group consisting of ethylene glycol, propylene glycol, cyclohexane-1,3-diol, cyclohexane-1,4-dimethanol, neopentyl glycol and 2,2-bis[4-($\beta$-hydroxyethoxy)phenyl] propane; and $\beta$-hydroxyethoxy benzoate.

10. The coated hollow metal tube of claim 6 wherein said ethylene terephthalate unit and said ester-forming unit other than the ethylene terephthalate unit are obtained from a blend of polyethylene terephthalate and a member selected from the group consisting of a polyethylene isophthalate, polyethylene adipate, pollypropylene terephthalate, polyneopentyl terephthalate and poly (p-ethoxy benzoate), respectively.

11. The coated hollow metal tube of claim 6 wherein the metal of said tube consists of a member selected from the group of iron, aluminum, copper and alloys thereof.

12. The coated hollow metal tube of claim 6 wherein the metal tube consists of steel.

13. The coated hollow metal tube of claim 6 wherein the metal tube consists of aluminum.

14. The coated hollow metal tube of claim 6 wherein said crystalline copolyester is composed of ethylene terephthalate units and neopentyl terephthalate units.

15. The coated hollow metal tube of claim 6 wherein said crystalline copolyester is composed of ethylene terephthalate units and ethylene isophthalate units.

16. The coated hollow metal tube of claim 6 wherein said crystalline copolyester is composed of 95 to 80 mole% of ethylene terephthalate units and 5 to 20 mole% of a neopentyl terephthalate units.

17. A hollow metal tube coated with a thin film of a thermoplastic crystalline copolyester and being processable by bending, pressing or punching without the cracking or peeling of the coating; said hollow metal tube having a thin coating adhered tightly to the outer surface thereof of a thermoplastic crystalline copolyester composed of 95 to 80 mole%, based on its entire recurring units, of ethylene terephthalate units and 5 to 20 mole%, based on its entire recurring units, of a copolymerizable neopentyl terephthalate unit and having a second order transition point of at least 50° C., said coating having a degree of crystallization of more than 1% and not more than 10%, and not more than ⅓ of its crystallizing ability, said polyester having a crystallizing ability of at least 15%, said crystallizing ability being the degree of crystallization attained when the copolyester in a substantially amorphous state is maintained at 150° C. for 3 hours, and said coating having a thickness of 50 to 300 microns.

* * * * *